US012776873B2

(12) United States Patent
Yao et al.

(10) Patent No.: US 12,776,873 B2
(45) Date of Patent: Oct. 27, 2026

(54) SYSTEMS AND METHODS FOR NON-CODEBOOK BASED TRANSMISSION

(71) Applicant: ZTE CORPORATION, Shenzhen (CN)

(72) Inventors: Ke Yao, Shenzhen (CN); Shujuan Zhang, Shenzhen (CN); Bo Gao, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 324 days.

(21) Appl. No.: 18/533,404

(22) Filed: Dec. 8, 2023

(65) Prior Publication Data

US 2024/0113827 A1 Apr. 4, 2024

Related U.S. Application Data

(63) Continuation of application No. PCT/CN2021/118141, filed on Sep. 14, 2021.

(51) Int. Cl.
*H04L 5/00* (2006.01)
*H04B 7/0456* (2017.01)

(52) U.S. Cl.
CPC ......... *H04L 5/0048* (2013.01); *H04B 7/0456* (2013.01); *H04L 5/0012* (2013.01)

(58) Field of Classification Search
None
See application file for complete search history.

(56) References Cited

U.S. PATENT DOCUMENTS

2018/0219576 A1* 8/2018 Bhattad ................. H04W 72/23
2020/0107341 A1 4/2020 Zhang et al.
2021/0044400 A1* 2/2021 Jiang ..................... H04L 5/0048
2023/0040860 A1* 2/2023 Yuan .................... H04B 7/0456
2023/0216636 A1* 7/2023 Li ......................... H04L 5/0048
370/329

FOREIGN PATENT DOCUMENTS

CN 110545168 A 12/2019
WO WO-2019/098935 A1 5/2019
WO WO-2021/026679 A1 2/2021
WO WO2023/019584 A1 * 2/2023 ........... H04B 7/0456

OTHER PUBLICATIONS

Nokia, "Introduction of NR URLLC support", 3GPP TSG-RAN WG1 Meeting #99, R1-1913650, Nov. 22, 2019, Reno, USA (51 pages).
Partial Supplementary European Search Report for EP Appl. No. 21956998.5, dated Jul. 12, 2024 (22 pages).
(Continued)

*Primary Examiner* — Abdelillah Elmejjarmi
(74) *Attorney, Agent, or Firm* — Foley & Lardner LLP

(57) ABSTRACT

Systems and methods for wireless communication systems are disclosed. In one aspect, the wireless communication method includes receiving, by a wireless communication device from the network, at least one indicator and determining precoding information for an uplink transmission based on the at least one indicator. Each of the at least one indicator corresponds to a respective first resource group.

18 Claims, 11 Drawing Sheets

(56) References Cited

OTHER PUBLICATIONS

CATT, "On UL enhancements in Rel-18", 3GPP TSG RAN Meeting #93-e, RP-212257, Sep. 17, 2021, Electronic Meeting (4 pages).
Huawei et al., "Non codebook based transmission for UL MIMO" 3GPP TSG RAN WG1 Meeting #89, R1-1706923, May 19, 2017, Hangzhou, China (6 pages).
Huawei, et al., "Enhancements on multi-TRP for reliability and robustness in Rel-17", 3GPP TSG RAN WG1 Meeting #104-e, R1-2100209, Feb. 5, 2021, E-meeting (14 pages).
Huawei, et al., "Updated views on Rel-18 uplink enhancement", 3GPP TSG RAN Meeting #93-e, RP-212151, Sep. 17, 2021, Electronic Meeting (15 pages).
International Search Report and Written Opinion for PCT Appl. No. PCT/CN2021/118141, mailed Mar. 28, 2022 (8 pages).
Nec, "Views on Rel-18 Uplink enhancements", 3GPP TSG-RAN #93e, RP-212434, Sep. 17, 2021, Electronic Meeting (2 pages).
Nokia et al., "Enhancements on SRS flexibility, Coverage and Capacity", 3GPP TSG RAN WG1 #104-e, R1-2101010, Feb. 5, 2021, e-meeting (19 pages).
Nokia, et al., "Enhancements for Multi-TRP URLLC schemes", 3GPP TSG RAN WG1 #104-e Meeting, R1-2101006, Feb. 5, 2021, e-Meeting (22 pages).
NTT Docomo, Inc, "Discussion on MTRP for reliability", 3GPP TSG RAN WG1 #104bis-e, R1-2103560, Apr. 20, 2021, e-Meeting (20 pages).
Vivo, "Further discussion on Multi-TRP for PDCCH, PUCCH and PUSCH enhancements", 3GPP TSG RAN WG1 #106-e, R1-2106572, Aug. 27, 2021, e-Meeting (28 pages).
Xiaomi, "Discussion on SRS enhancements", 3GPP TSG-RAN WG1 Meeting #104-e, Tdoc R1-2101096, Feb. 5, 2021, e-Meeting (9 pages).
Extended European Search Report for EP Appl. No. 21956998.5, dated Oct. 4, 2024 (16 pages).

* cited by examiner

SYSTEMS AND METHODS FOR NON-CODEBOOK BASED TRANSMISSION

CROSS-REFERENCE TO RELATED APPLICATION

This application claims the benefit of priority under 35 U.S.C. § 120 as a continuation of PCT Patent Application No. PCT/CN2021/118141, filed on Sep. 14, 2021, the disclosure of which is incorporated herein by reference in its entirety.

TECHNICAL FIELD

The disclosure relates generally to wireless communication, including but not limited to systems and methods of non-codebook based transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One aspect is a wireless communication method, including receiving, by the wireless communication device from the network, at least one indicator. Each of the at least one indicator corresponds to a respective first resource group. The method includes determining precoding information for an uplink transmission based on the at least one indicator.

In some arrangements, the indicator includes an SRS resource indicator (SRI), or the uplink transmission includes a Physical Uplink Shared Channel (PUSCH).

In some arrangements, the first resource group includes one or more RBs according to at least one of a sub-band bandwidth, a wideband bandwidth, a bandwidth of scheduled resource for the uplink transmission, a bandwidth of a serving cell on which the uplink transmission is transmitted, or a bandwidth of a Bandwidth Part (BWP) on which the uplink transmission is transmitted.

In some arrangements, the sub-band bandwidth is determined according to one of a basic sub-band bandwidth, received by the wireless communication device from the network, for an uplink transmission, or a Physical Resource Block (PRB) bundling size for a downlink transmission determined by the wireless communication device.

In some arrangements, the precoding information includes first precoding information and second precoding information, and the first precoding information for an uplink transmission on a first frequency resource is same as the second precoding information for an uplink transmission on a second frequency resource. The second frequency resource corresponds to a first frequency resource with frequency hopping.

In some arrangements, a frequency hopping offset is determined based on an integer value multiplied by the sub-band bandwidth.

In some arrangements, determining, by a wireless communication device, a second resource group for transmitting an uplink reference signal to a network.

In some arrangements, at least one of precoders for a transmission of the uplink reference signal on at least one Resource Block (RB) or at least one Resource Element (RE) within a first resource group are same, precoders for a transmission of the uplink reference signal on at least one RB or at least one RE within a second resource group are same, or precoders for a transmission of the uplink transmission on at least one RB or at least one RE within a first resource group are same.

In some arrangements, the second resource group is determined according to one of a sub-band bandwidth, a wideband bandwidth, a bandwidth of scheduled resource for the uplink reference signal, a bandwidth of a serving cell on which the uplink reference signal is transmitted, or a bandwidth of a BWP on which the uplink reference signal is transmitted.

In some arrangements, the precoding information for the uplink transmission on a first resource group is same as precoding information for the uplink reference signal resource indicated by the indicator for the first resource group.

In some arrangements, the indicator includes a first indicator and at least one second indicator, the first indicator corresponds to a wideband, and each of the at least one second indicator corresponds to a respective sub-band.

In some arrangements, a rank of the uplink transmission is greater than 1.

In some arrangements, the first indicator indicates a precoder for a first layer of the uplink transmission, and the second indicator indicates a precoder for a layer of the uplink transmission other than the first layer.

Another aspect is a wireless communication apparatus including at least one processor and a memory, the at least one processor configured to read code from the memory and implement a wireless communication method. The method includes receiving, by the wireless communication device from the network, at least one indicator. Each of the at least one indicator corresponds to a respective first resource group. The method includes determining precoding information for an uplink transmission based on the at least one indicator.

Another aspect is a computer program product including a computer-readable program medium code stored thereupon, the code, when executed by at least one processor, causing the at least one processor to implement a wireless communication method. The method includes receiving, by the wireless communication device from the network, at least one indicator. Each of the at least one indicator corresponds to a respective first resource group. The method includes determining precoding information for an uplink transmission based on the at least one indicator.

Another aspect is a wireless communication method, including transmitting, by a wireless communication device to a network, an uplink reference signal, determining, by the wireless communication device, at least one uplink reference signal resource according to an indicator, and transmitting, by the wireless communication device, uplink transmission based on the at least one uplink reference signal resource.

In some arrangements, the uplink reference signal includes Sounding Reference Signal (SRS), the indicator includes an SRI determined based on at least one group of SRS resources, or the uplink transmission includes a PUSCH.

In some arrangements, each of the plurality of uplink reference signal resources is identified by an index value, a first uplink reference signal resource of the plurality of uplink reference signal resources with a higher index value is associated with first channel conditions, and a second uplink reference signal resource of the plurality of uplink reference signal resources with a lower index value is associated with second channel conditions. According to the predefined order, the first channel conditions is better than the second channel conditions, or the second channel conditions is better than the first channel conditions.

In some arrangements, precoding information of the uplink transmission is same as precoding information of the uplink reference signal.

In some arrangements, the indicator indicates an entry from a predefined or a configured table, the entry indicates a first number of uplink reference signal resources from a second number of groups, and the first number and the second number are integers.

In some arrangements, each of the groups includes an SRS resource group or a port group, or the second number is a number of groups in an SRS resource set.

In some arrangements, the first number is the rank value.

In some arrangements, the first number is equal to a sum of $x_g$. $x_g$ is number of indicated uplink reference signal resources in a group with an index g among the second number of groups, and $x_g$ is an integer equal to or greater than 0.

In some arrangements, the indicated uplink reference signal resources in the group with the index g include first $x_g$ uplink reference signal resources in a group with an index g in a predefined order.

In some arrangements, the method further includes receiving, by the wireless communication device, an uplink Reference Signal resource group indication with uplink Reference Signal resource indication.

In some arrangements, the determining at least one uplink reference signal resource according to an indicator includes determining, by the wireless communication device, channel conditions with respect to communications between the wireless communication device and the network, and determining, by the wireless communication device, the at least one uplink reference signal resource based on the channel conditions and a predefined order of a plurality of uplink reference signal resources, the plurality of uplink reference signal resources including the at least one uplink reference signal resource.

In some arrangements, the method further includes determining, by the wireless communication device, at least one uplink reference signal resource group.

In some arrangements, the at least one uplink reference signal resource group is determined according to a predefined rule or an uplink reference signal group indication received by the wireless communication device from the network.

In some arrangements, the wireless communication device determines the uplink reference signal resource from each of the at least one uplink reference signal resource group.

In some arrangements, the M uplink reference signal resources are uplink reference signal resources with lowest or highest indexes within the uplink reference signal resource group, or the M uplink reference signal resources are uplink reference signal resources with odd or even indexes within the uplink reference signal resource group.

In some arrangements, the at least one given uplink reference signal resource group is determined in a predefined method or according to information received by the wireless communication device from the network.

In some arrangements, the method further includes receiving, by the wireless communication device, an uplink reference signal indication. The uplink reference signal indication indicates a number (M) of one or more uplink reference signal resources in each of the at least one uplink reference signal resource group, or a number (M) of one or more uplink reference signal resources in at least one given uplink reference signal resource group, where M is an integer from 1 to a number of uplink reference signal resources in a uplink reference signal resource group.

Another aspect is a wireless communication apparatus including at least one processor and a memory, the at least one processor configured to read code from the memory and implement a wireless communication method. The method includes transmitting, by a wireless communication device to a network, an uplink reference signal, determining, by the wireless communication device, at least one uplink reference signal resource according to an indicator, and transmitting, by the wireless communication device, uplink transmission based on the at least one uplink reference signal resource.

Another aspect is a computer program product including a computer-readable program medium code stored thereupon, the code, when executed by at least one processor, causing the at least one processor to implement a wireless communication method. The method includes transmitting, by a wireless communication device to a network, an uplink reference signal, determining, by the wireless communication device, at least one uplink reference signal resource according to an indicator, and transmitting, by the wireless communication device, uplink transmission based on the at least one uplink reference signal resource.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
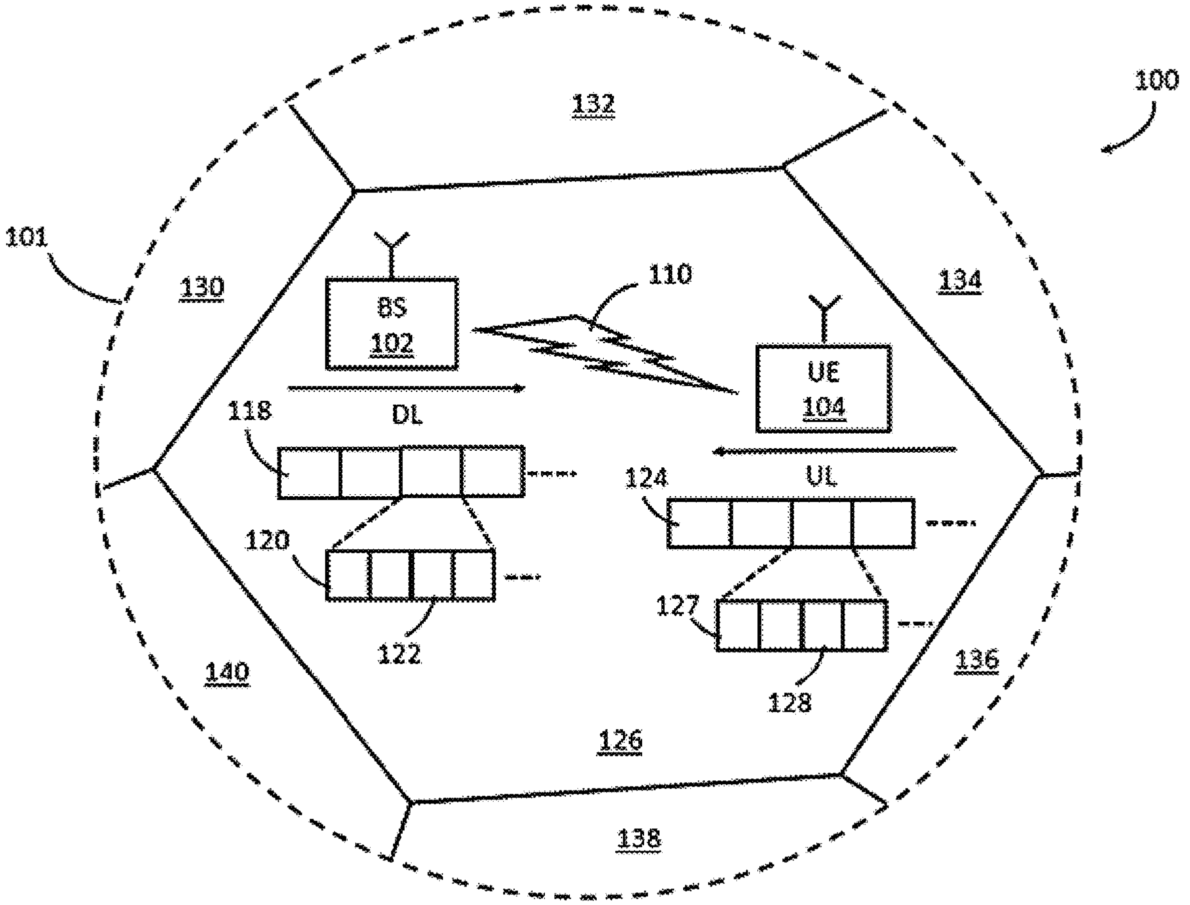
FIG. 1 illustrates an example wireless communication system in which techniques disclosed herein can be implemented, in accordance with some arrangements of the present disclosure.

FIG. 1 illustrates an example wireless communication system 100 in which techniques disclosed herein can be implemented, in accordance with some arrangements of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a LMF). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
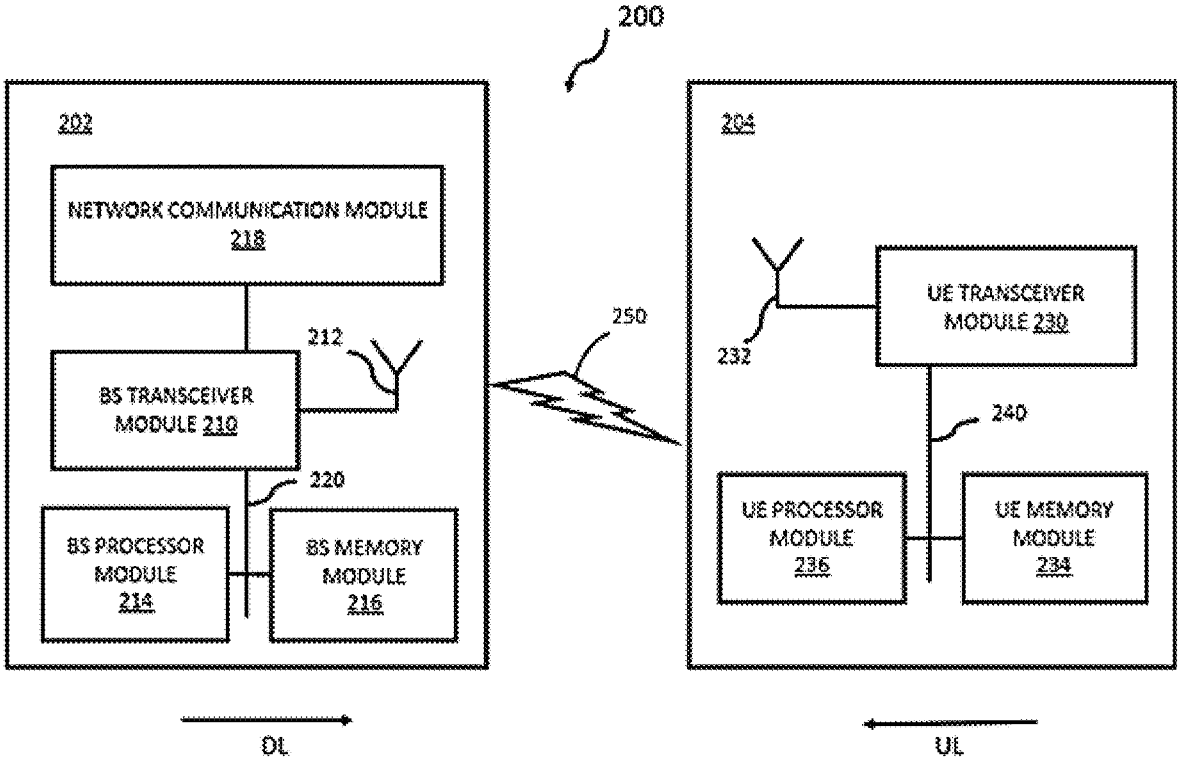
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals), in accordance with some arrangements of the present disclosure.

FIG. 2 illustrates a block diagram of an example wireless communication system 200 for transmitting and receiving wireless communication signals (e.g., OFDM or OFDMA signals) in accordance with some arrangements of the present disclosure. The system 200 may include components and elements configured to support known or conventional operating features that need not be described in detail herein. In one illustrative arrangement, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some arrangements, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an evolved node B (eNB), a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some arrangements, a first layer may be a physical layer. In some arrangements, a second layer may be a MAC layer. In some arrangements, a third layer may be a Radio Link Control (RLC) layer. In some arrangements, a fourth layer may be a Packet Data Convergence Protocol (PDCP) layer. In some arrangements, a fifth layer may be a RRC layer. In some arrangements, a sixth layer may be a Non Access Stratum (NAS) layer or an Internet Protocol (IP) layer, and the seventh layer being the other layer.

Typically, frequency selective precoding is not supported for UL transmission, especially for non-codebook based PUSCH. Further, 8 antenna ports are not supported for UL transmission. Overhead reduction of SRI can be considered especially for non-codebook based PUSCH.

One of the key features of the NR technology of 5G mobile communication systems is the support of high frequency bands. High frequency bands have abundant frequency domain resources, but wireless signals in high frequency bands decay quickly and coverage of the wireless signals becomes small. Thus, transmitting signals in a beam mode is able to concentrate energy in a relatively small spatial range and to improve the coverage of the wireless signals in the high frequency bands.

Method for Frequency Selective Non-Codebook Based Transmission

PUSCH transmission can be scheduled based on SRS transmission. SRS resource(s) can be configured in SRS resource set with usage of codebook or non-codebook. The network (e.g., a BS such as the gNB) can configure the SRS resources(s) to UE via RRC signaling used for codebook based PUSCH transmission or non-codebook based PUSCH transmission respectively.

In a frequency selective scenario, channel properties may be very different among sub-bands. One precoding information for a whole scheduling frequency resource may not provide enough flexibility. In such case, precoding information can be determined or provided per sub-band.

In some arrangements, a UE can determine a first frequency bandwidth (e.g., a basic sub-band bandwidth), the UE can determine a second frequency bandwidth (e.g., a sub-band or a wide band) for a SRS transmission, the UE can receive at least one SRI from a gNB (or a network), and each of the at least one SRI can be for a third frequency bandwidth (e.g., one SRI for a wide band or all of sub-bands, or at least one SRI for at least one sub-band), and the UE can determine precoding information for a PUSCH transmission (e.g., precoding information may include at least one precoder for at least one frequency part of PUSCH transmission based on the first frequency bandwidth).

In some arrangements, the first frequency bandwidth can be determined according to at least one of a basic sub-band bandwidth for uplink (e.g., configured or indicated by the gNB), or a PRB bundling size for downlink (e.g. configured or indicated by the gNB).

In some arrangements, the second frequency bandwidth can be determined according to the first frequency bandwidth, or a wideband. (e.g., the second frequency bandwidth is N2 times the first frequency bandwidth, where N2 is an integer. For example, N2 is 1).

In some arrangements, the third frequency bandwidth can be determined according to the first frequency bandwidth, or a wideband. (e.g., the third frequency bandwidth is N3 times the first frequency bandwidth, where N3 is an integer. For example, N3 is 1 or more than 1).

In some arrangements, the third frequency bandwidth can be determined according to the second frequency bandwidth. (e.g., the third frequency bandwidth is equal to the second frequency bandwidth).

In some arrangements, the third frequency bandwidth can be determined according to a frequency bandwidth of the PUSCH transmission (e.g., a frequency bandwidth of frequency domain resource scheduled by the gNB for the PUSCH transmission to the UE, or a frequency bandwidth of frequency domain resource which can be scheduled (e.g., at most a BWP) by the gNB for the PUSCH transmission to the UE).

In some arrangements, the third frequency bandwidth can be determined according to a frequency bandwidth of the serving cell or a BWP on which the PUSCH transmission is scheduled.

If a frequency bandwidth is determined as “wideband,” the UE may assume or determine that the frequency bandwidth is the bandwidth of the allocated resource for a transmission, such as SRS transmission in the case of second frequency bandwidth, or a PUSCH transmission in the case of the third frequency bandwidth.

In some arrangements, the same precoding can be assumed or determined to be applied within a first frequency bandwidth, or a second frequency bandwidth.

For a first frequency domain resource, a precoder for a PUSCH transmission may be the same as the precoder for an SRS resource(s) indicated by the SRI.

The first frequency domain resource may correspond to a frequency domain resource with a bandwidth determined by the first frequency bandwidth, for example, a sub-band with the first frequency bandwidth, or a sub-band with a bandwidth less than the first frequency bandwidth.

For a first frequency domain resource, precoders for an SRS transmission on at least one RB or at least one RE within the first frequency domain resource may be the same. For example, while no such property for precoders for a SRS transmission on different first frequency domain resources. The benefit can be the receiver, e.g., the gNB can do interpolation among RBs or REs within a first frequency domain resources.

For example, a UE can determine a first frequency bandwidth (e.g., a basic sub-band bandwidth) for a SRS transmission and/or for a PUSCH transmission. Precoders for a SRS/PUSCH transmission on at least one RB or at least one RE may be the same within a first frequency bandwidth. And precoders for a SRS/PUSCH transmission on different first frequency domain resources may be the same or different.

In some arrangements, the first frequency bandwidth can be determined according to a basic sub-band bandwidth for uplink, e.g., configured or indicated by the gNB, or a PRB bundling parameter for downlink, e.g., bundling size configured or indicated by the gNB.

UE can report the capability to support PRB bundling function for uplink to gNB. Further candidate PRB bundling size can also be reported. Or UE may report the capability to reuse at least part of the PRB bundling parameters for downlink. The gNB can configure or indicate the basic sub-band bandwidth for uplink based on the UE capability.

Determining frequency bandwidth for SRS transmission and PUSCH transmission can be performed with the following schemes.

Figure 3:
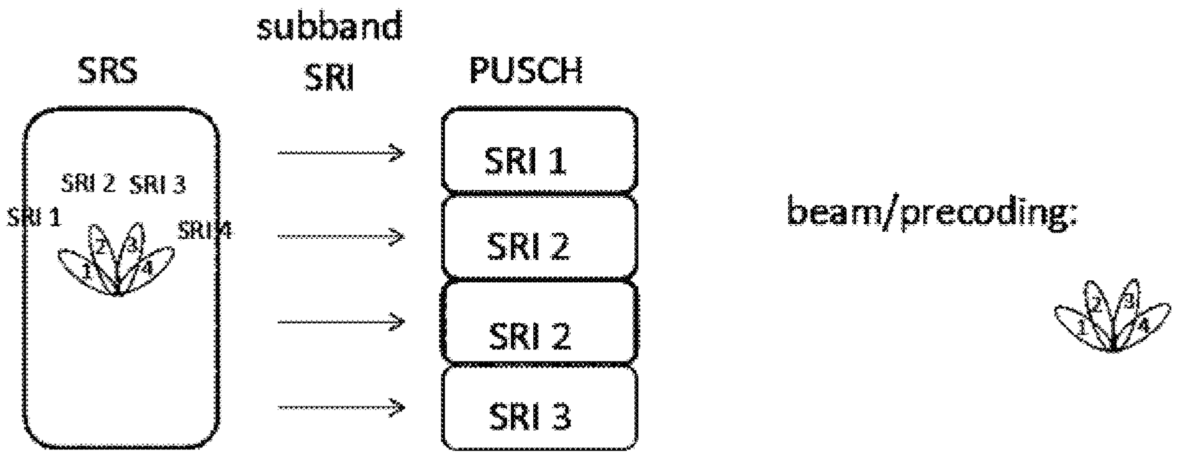
FIGS. 3, 4, and 5 each illustrates a scheme for determining frequency bandwidth for SRS transmission and PUSCH transmission, in accordance with some arrangements of the present disclosure.

Referring to FIG. 3, a first scheme is illustrated, in accordance with some arrangements. A precoder for SRS transmission can be a wideband precoder. SRI can be indicated per sub-band (e.g., a first frequency domain resource determined based on the first frequency bandwidth). The precoder for PUSCH on each first frequency domain resource can be the same as the precoder for SRS resource(s) on the same first frequency domain resource indicated by the SRI.

Figure 4:
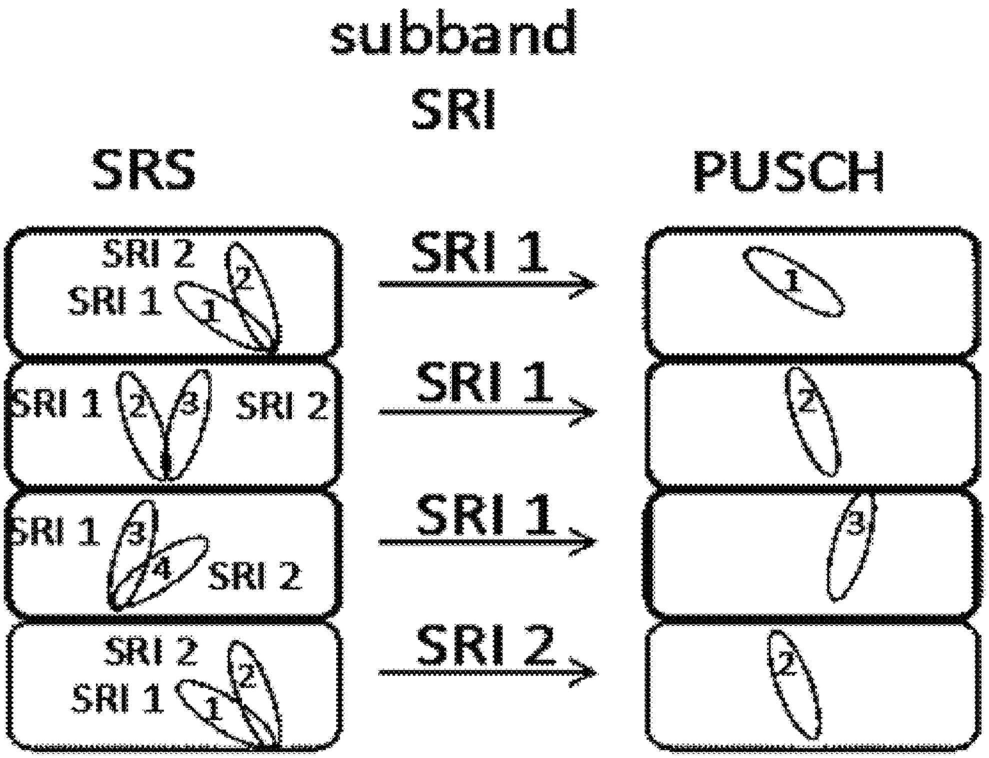

Referring to FIG. 4, a second scheme is illustrated, in accordance with some arrangements. Precoders for SRS transmission can be a sub-band precoder. SRI can be indicated per sub-band (e.g., a first frequency domain resource determined based on the first frequency bandwidth). The precoder for PUSCH on each first frequency domain resource can be the same as the precoder for SRS resource(s) on the same first frequency domain resource indicated by the SRI.

Figure 5:
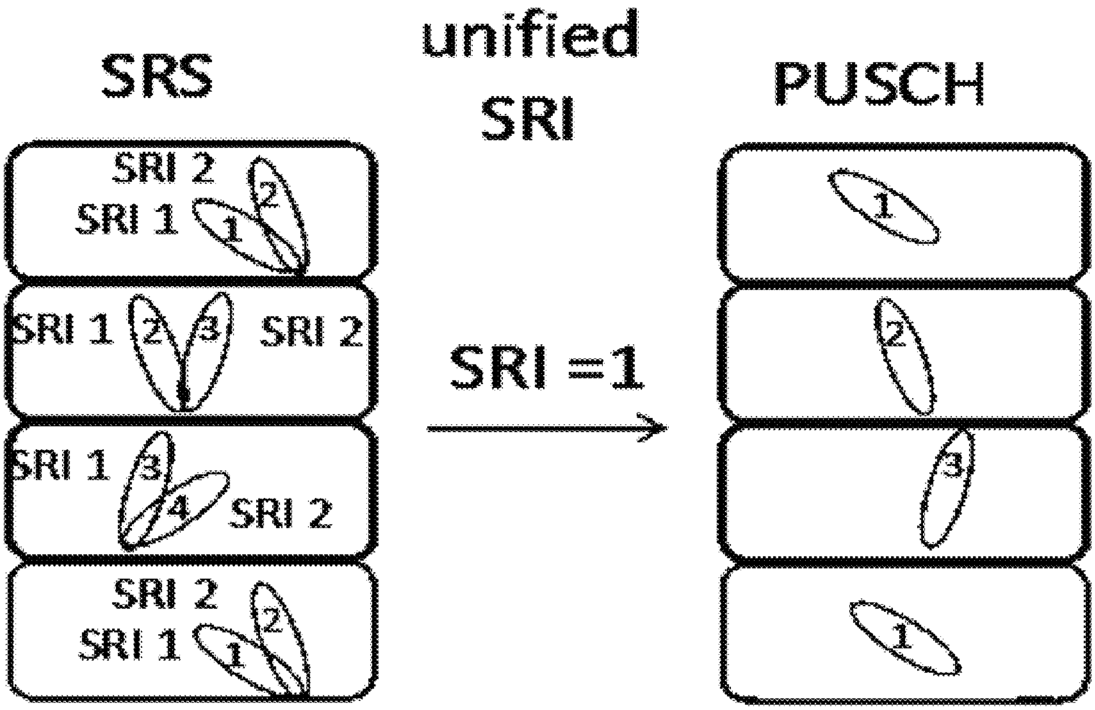

Referring to FIG. 5, a third scheme is illustrated, in accordance with some arrangements. The precoders for SRS transmission can be a sub-band precoder. SRI can be indicated per wideband (e.g., only one SRI can be used for all first frequency domain resources determined based on the first frequency bandwidth). The precoder for PUSCH on each first frequency domain resource can be the same as the precoder for SRS resource(s) on the same first frequency domain resource indicated by the SRI. In this case, SRI can be the same for all first frequency domain resources, but the indicated SRS resources on different first frequency domain resources may be different, and precoders may be different as well.

In some arrangements, when channel reciprocity exists among downlink and uplink, UE can obtain channel property by measuring DL RS, e.g., CSI-RS. Then the UE can determine precoder (also referred to as beam) for SRS per sub-band. There may be different precoders for different sub-bands. So sub-band precoding (also referred as frequency selective precoding) SRS can provide flexibility for UE implementation. Furthermore, the number of SRS resources in a SRS resource set may be reduced. For example, 4 SRS resources may be needed for a SRS resource set when considering various channel property for a wideband, but fewer SRS resources, e.g., 2 SRS resources may be needed for a SRS resource set for sub-band precoding SRS. In some arrangements, 2 SRS resources on different sub-band may correspond to different precoders according to measurement of DL RS per sub-band.

In some arrangements, a UE can receive, from a gNB (or referred as a network), at least one indicator. Each of the at least one indicator corresponds to a respective first resource group, and the UE can determine precoding information for an uplink transmission based on the at least one indicator. The indicator can include an SRI, or the uplink transmission can include a PUSCH.

The first resource group can include one or more RBs according to at least one of: a sub-band bandwidth, a wideband bandwidth, a bandwidth of scheduled resource for the uplink transmission, a bandwidth of a serving cell on which the uplink transmission is transmitted, or a bandwidth of a BWP on which the uplink transmission is transmitted.

The bandwidth can include at least one RB in the frequency domain That is the bandwidth is noted with unit of RB, e.g., assuming a sub-band bandwidth (also called a precoding granularity, or a basic sub-band bandwidth) is 4 RBs (or PRB, physical layer RB).

In some arrangements, the number of the first resource groups and the number of RBs within each first resource group may depend on at least one of start RB of the consecutive RBs, sub-band bandwidth, or number of RBs scheduled for the PUSCH transmission. For example, the first resource group may include a number of RBs equal to or less than 4 RBs (e.g., the sub-band bandwidth). In some arrangements, a consecutive RBs scheduled for a PUSCH transmission, (e.g., 10 RBs) may include 3 first resource groups including 4RBs, 4RBs and 2RBs, respectively. Alternatively it may include 4 first resource groups including 1RB, 4RBs, 4RBs and 1RB, respectively.

In some arrangements, the UE can determine a second resource group for transmitting an uplink reference signal (e.g., SRS) to the network. The second resource group can be determined according to one of: a sub-band bandwidth, a wideband bandwidth, a bandwidth of scheduled resource for the uplink reference signal, a bandwidth of a serving cell on which the uplink reference signal is transmitted, or a bandwidth of a BWP on which the uplink reference signal is transmitted.

The second resource group can be based on a sub-band or wideband, which can be independent of whether the first resource group is based on a sub-band or wideband. But in a given frequency domain, PUSCH transmission may have same precoding information as SRS.

The sub-band bandwidth can be determined according to one of: a basic sub-band bandwidth, received by the UE from the network, for an uplink transmission, or a PRB bundling size for a downlink transmission determined by the UE.

Wideband SRI and Sub-Band SRI

SRI can be provided with wideband part and sub-band part, e.g., for the case of rank of greater than 1. The wideband part SRI may indicate SRI for the first layer, and the sub-band part SRI may indicate SRI for the layers other than the first layer.

The SRI can include a first SRI and at least one second SRI. The first SRI can be for a wideband, and each second SRI can be for a sub-band.

When rank for the PUSCH transmission is larger than 1, the SRI can include a first SRI and at least one second SRI.

The first SRI can indicate precoder for the first layer of PUSCH transmission. The second SRI can indicate precoder for the layer of PUSCH transmission other than the first layer.

Frequency Hopping

An uplink transmission, e.g., SRS or PUSCH transmission, can be transmitted with frequency hopping. For example, the uplink transmission can be transmitted on frequency resource 1 during time period 1, and the uplink transmission can be transmitted on frequency resource 2 during time period 2. Frequency resource 1 can be different from frequency resource 2, e.g. frequency resource 2 can be determined by frequency resource 1 by (modular) adding a frequency hopping offset.

In some arrangements, a precoder for a transmission on a frequency resource can be the same as the precoder for a transmission on a corresponding frequency resource after frequency hopping.

In some arrangements, a frequency hopping offset can be an integer value times the first frequency bandwidth.

Figure 6:
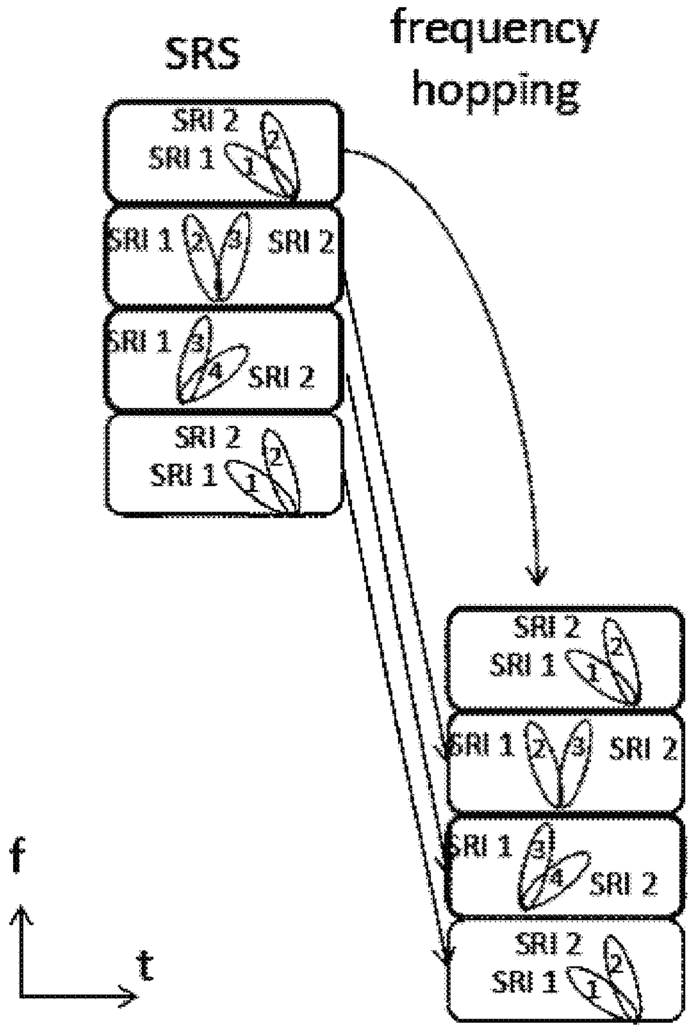
FIG. 6 illustrates frequency hopping for uplink transmission for the SRS or PUSCH transmission, in accordance with some arrangements of the present disclosure.

Referring to FIG. 6, for a SRS transmission, a precoder for a transmission on frequency resource 1 can be the same as the precoder for a transmission on frequency resource 2 (after frequency hopping). Frequency resource 1 can correspond to frequency resource 2 considering frequency hopping. A frequency hopping offset can be an integer value (e.g. 4) times the first frequency bandwidth.

Method for SRI Indication for Non-Codebook Based Transmission

UE may support 8 Tx (transmit antennas) for UL transmission. When channel reciprocity does not exist between DL and UL, e.g., for FDD case or TDD case without antenna calibration, 8Tx non-precoded SRS can be transmitted by UE. Then gNB obtains the UL channel information by measuring 8 Tx SRS, and then can indicate transmit precoding matrix indication (TPMI) and/or transmit rank indicator/information (TRI) to UE for PUSCH transmission. TPMI and/or TRI can be indicated to UE in DCI. TPMI can be an index indicating a predefined precoding matrix. This can include codebook based PUSCH transmission. TPMI can indicate a quantized precoding matrix compared with initial precoding matrix obtaining from the UL channel information by gNB, and can lead to performance loss to some extent.

When channel reciprocity exists between DL and UL, the UE can calculate UL precoders based on DL RS, e.g. CSI-RS. The gNB can configure UE 8 SRS resources, and then UE can transmit configured 8 SRS resources, e.g. SRS resource{0, 1, 2, 3, 4, 5, 6, 7}, where each SRS resource is configured with one SRS port and the precoder of SRS is based on DL CSI-RS. After the UE transmits the configured SRS resources, gNB can indicate SRI in DCI for PUSCH transmission, where one indicated SRS resource corresponds to one layer transmission. The precoder for a PUSCH layer transmission can be determined based on the precoder of corresponding SRS resource. For example, if the SRS resources indicated by SRI(s) are SRS resource 1 and 3, a two-layer PUSCH transmission can be scheduled and the precoders for two layers can be the same as SRS ports in SRS resource 1 and 3 respectively.

Usually, for R layers transmission, any R SRS resources can be indicated to UE by SRI(s) in DCI for most flexibility. So for one layer transmission, 8 states may be needed to indicate which one of eight SRS resources are indicated.

For 2 layers transmission, $$C_8^2 = 28$$

states may be needed to indicate which two of eight SRS resources are indicated for PUSCH transmission.

For 3 layers transmission, $$C_8^3 = 56$$

states may be needed to indicate which three of eight SRS resources are indicated for PUSCH transmission.

For 3 layers transmission, $$C_8^4 = 70$$

states may be needed to indicate which four of eight SRS resources are indicated for PUSCH transmission.

In total, 8+28+56+70=162 states may be needed and $\log_2(162)=8$ bits in DCI can be reserved for SRI if the maximum rank UE supported is 4. If UE supports maximum 8 layers, 8 bits may also be needed, $$\log 2\left(C_8^1 + C_8^2 + C_8^3 + C_8^4 + C_8^5 + C_8^6 + C_8^7 + C_8^8\right) = 8 \text{ bits}$$

Accordingly, the SRI overhead is quite large and may not be realistic.

In some arrangements, a UE can transmit SRS resources in a SRS resource set according to a predefined order (e.g., ascending or descending order) of channel conditions, e.g., based on DL-RS (e.g., CSI-RS). For example, SRS transmission with better precoder/SNR can be arranged to the SRS resource with lower or higher SRS resource index for an ascending or a descending order. For example, a better precoder/SNR refers to lower noise or higher SNR. In addition, the SRS precoder for non-codebook based SRS can be transparent to the gNB. So the first R SRS resources may be used for rank R transmission.

In some arrangements, the 8 SRS resources can be configured within one SRS resource set.

In some arrangements, the SRI overhead can be reduced according to a panel setting (or SRS resource group setting) for a SRS resource set.

For panel setting 1: 8 SRS resources can include 4 SRS resource groups, and each SRS resource group can correspond to a panel.

For each panel, the SRS resource with lower (or higher) SRS resource index can be associated with better precoder/SNR. Then the number of SRS resources (or SRS ports or layers) may be used, instead of the indexes of the chosen SRS resources. For example, for a panel corresponding to 2 SRS resources, if one layer/SRS port is needed, SRS resources indexes 0, or 1 can be considered without the above assumption, but if the above assumption is applied, only SRS resources index 0 would be considered.

For this panel setting, for rank=1 (e.g., 1 layer or 1 SRS port), $$C_8^1$$

can be reduced to $$C_4^1 = 4,$$

which means only a panel is chosen, and the 1 lowest (or highest) SRS resource index is actually indicated.

In some arrangements, for rank=2 (e.g., 2 layers or 2 SRS ports)

$$C_8^2$$

can be reduced to $$C_4^2 = 6$$

when 2 SRS resources are from 2 panels, and $$C_4^1 = 4$$

when 2 SRS resources are from 1 panel. The sum can be 10.

In some arrangements, for rank=3 (e.g., 3 layers or 3 SRS ports), $$C_8^3$$

can be reduced to $$C_4^3 = 4$$

when 3 SRS resources are from 3 panels, and $$C_4^1 C_3^1 = 12$$

when 3 SRS resources are from 2 panels, where one panel corresponding to 2 SRS resources and the other panel corresponds to 1 SRS resource. The sum is 16.

In some arrangements, for rank=4 (e.g., 4 layers or 4 SRS ports), $$C_8^4$$

can be reduced to $$C_4^4 = 1$$

when 4 SRS resources are from 4 panels (each panel corresponding to 1 SRS resource), $$C_4^1 C_3^2 = 12$$

when 4 SRS resources are from 3 panels (one panel corresponding to 2 SRS resources and each of the other panels corresponding to 1 SRS resource), and $$C_4^2 = 6$$

when 4 SRS resources are from 2 panels (each panel corresponding to 2 SRS resources). The sum is 19.

In some arrangements, for rank=5 (e.g., 5 layers or 5 SRS ports), $$C_8^5$$

can be reduced to $$C_4^1 = 4$$

(e.g., number of SRS resources combination of "2+1+1+1") when 1 panel among 4 panels is chosen for 2 SRS resources and each of the other 3 panels corresponding to 1 SRS resource, and $$C_4^2 C_2^1 = 12$$

(e.g., number of SRS resources combination of "2+2+1") when 2 panels among 4 panels are chosen each for 2 SRS resources and 1 panel among the other 2 panels is chosen for 1 SRS resource. The sum is 16.

In some arrangements, for rank=6 (e.g., 6 layers or 6 SRS ports), $$C_8^6$$

can be reduced to $$C_4^2 = 6$$

(e.g., number of SRS resources combination of "2+2+1+1") when 2 panels among 4 panels are chosen each for 2 SRS resources and each of the other 2 panels corresponding to 1 SRS resource, and $$C_4^3 = 4$$

(e.g., number of SRS resources combination of "2+2+2") when 3 panels among 4 panels are chosen each for 2 SRS resources. The sum is 10.

In some arrangements, for rank=7 (e.g., 7 layers or 7 SRS ports), $$C_8^7$$

can be reduced to $$C_4^1 = 4$$

(e.g., number of SRS resources combination of "2+2+2+1") when 1 panel among 4 panels is chosen for 1 SRS resource and each of the other 3 panels corresponding to 2 SRS resources.

In some arrangements, for rank=8 (e.g., 8 layers or 8 SRS ports), $$C_8^8$$

can be equal to $$C_4^4$$

=1 (e.g., number of SRS resources combination of "2+2+2+2").

In some arrangements, if the maximum rank UE supported is 4, 4+10+16+19=49 states can be used, and 6 bits in DCI can reserved for SRI.

In some arrangements, if the maximum rank UE supported is 8, 4+10+16+19+16+10+4+1=80 states can be used, and 7 bits in DCI can be reserved for SRI.

For panel setting 2: 8 SRS resources can include 2 SRS resource groups, and each SRS resource group can correspond to a panel.

For each panel, the SRS resource with lower (or higher) SRS resource index can be arranged with better precoder/SNR. Then the number of SRS resources (or SRS ports or layers) can be used, instead of the exact indexes of the chosen SRS resources. For example, for a panel corresponding to 4 SRS resources, if one layer/SRS port is needed, SRS resources indexes 0, 1, 2 or 3 can be considered without the above assumption, but if the above assumption is applied, only SRS resources index 0 can be considered.

For this panel setting, for rank=1 (e.g., 1 layer or 1 SRS port), $$C_8^1$$

can be reduced to $$C_2^1 = 2,$$

which means only a panel is chosen, and the 1 lowest (or highest) SRS resource index is actually indicated.

In some arrangements, for rank=2 (e.g., 2 layers or 2 SRS ports), $$C_8^2$$

can be reduced to $$C_2^2 = 1$$

when 2 SRS resources are from 2 panels, and $$C_2^1 = 2$$

when 2 SRS resources are from 1 panel. The sum is 3.

In some arrangements, for rank=3 (e.g., 3 layers or 3 SRS ports), $$C_8^3$$

can be reduced to $$C_2^1 = 2$$

when 3 SRS resources are from 1 panel, and $$C_2^1 = 2$$

when 2 SRS resources are from the chosen panel and 1 SRS resource is from the other panel. The sum is 4.

In some arrangements, for rank=4 (e.g., 4 layers or 4 SRS ports), $$C_8^4$$

can be reduced to $$C_2^1 = 2$$

when 4 SRS resources are from 1 panel, and $$C_2^1 = 2$$

when 3 SRS resources are from the chosen panel and 1 SRS resource is from the other panel, and $$C_2^2 = 1$$

when each panel corresponding to 2 SRS resources. The sum is 5.

In some arrangements, for rank=5 (e.g., 5 layers or 5 SRS ports), $$C_8^5$$

can be reduced to $$C_2^1 = 2$$

when 4 SRS resources are from 1 chosen panel and 1 SRS resource is from the other panel, and $$C_2^1 = 2$$

when 3 SRS resources are from the chosen panel and 2 SRS resources are from the other panel. The sum is 4.

In some arrangements, for rank=6 (e.g., 6 layers or 6 SRS ports), $$C_8^6$$

can be reduced to $$C_2^1 = 2$$

when 4 SRS resources are from 1 chosen panel and 2 SRS resources are from the other panel, and $$C_2^2 = 1$$

when each panel corresponding to 3 SRS resources. The sum is 3.

In some arrangements, for rank=7 (e.g., 7 layers or 7 SRS ports), $$C_8^7$$

can be reduced to $$C_2^1 = 2$$

when 4 SRS resources are from 1 chosen panel and 3 SRS resources are from the other panel.

In some arrangements, for rank=8 (e.g., 8 layers or 8 SRS ports), $$C_8^8$$

can be equal to $$C_2^2 = 1.$$

In some arrangements, if the maximum rank UE supported is 4, 2+3+4+5=14 states can be used, and 4 bits in DCI can be reserved for SRI.

In some arrangements, if the maximum rank UE supported is 8, 2+3+4+5+4+3+2+1=24 states can be used, and 5 bits in DCI can be reserved for SRI.

In order to further reduce overhead of SRI, more restriction can be considered.

In some arrangements, panel/SRS resource group indication with or without SRS resource indication can be considered for SRI overhead reduction.

For panel setting 1, 8 SRS resources can include 4 SRS resource groups, and each SRS resource group can correspond to a panel.

First, panel(s) or SRS resource group(s) is selected, $$C_4^1 + C_4^2 + C_4^3 + C_4^4 = 15$$

states are needed, which corresponding to $\lceil \log_2(15) \rceil = 4$ bits.

Second, for SRS resource indication, if no explicit SRS resource indication is present, then 2 SRS resources for each of the indicated panel (or SRS resource group) can be implicitly indicated (or selected or chosen). For example, if panel 0 and 2 are indicated, the 2 SRS resources corresponding to panel 0 and the 2 SRS resources corresponding to panel 1 can be indicated. In this case, only rank=2/4/6/8 can be indicated.

In some arrangements, if 1 bit for SRS resource indication is present, 2 values may correspond to the first SRS resource for each of the indicated panel can be indicated, and both SRS resources for each of the indicated panel can be indicated respectively.

In some arrangements, if 1 bit for SRS resource indication is present, 2 values may correspond to the first SRS resource for each of the indicated panel can be indicated, and the second SRS resource for each of the indicated panel can be indicated respectively.

In some arrangements, if 1 bit for SRS resource indication is present, 2 values may correspond to an even number or an odd number for the number of SRS resource(s) for the last (or the first based on panel index) indicated panel. For example, if panel 0 and 2 are indicated, 0 (or 1) may indicate the first SRS resource for the last indicated panel are indicated, 1 (or 0) may indicate both SRS resources for the last indicated panel are indicated. For example, at least one given uplink reference signal resource group can be determined in a predefined method or according to information received by the UE from the gNB.

In some arrangements, if 2 bit for SRS resource indication is present, at least 3 cases (the first SRS resource, the second SRS resource, or both SRS resources for each of the indicated panel) can be indicated. For example, if panel 0 and 2 are indicated/selected/chosen, and "00", "01" and "10" are for the first SRS resource, the second SRS resource, or both SRS resources for each of the indicated panel 0 and 2 respectively.

For panel setting 2, 8 SRS resources can include 2 SRS resource groups, and each SRS resource group can correspond to a panel.

First, panel(s) or SRS resource group(s) can be selected, $$C_2^1 + C_2^2 = 3$$

states can be needed, which corresponding to $\lceil \log_2(3) \rceil = 2$ bits.

Second, for SRS resource indication, if no explicit SRS resource indication is present, then 4 SRS resources for each of the indicated panel can be implicitly indicated. For example, if panel 0 is indicated, the 4 SRS resources corresponding to panel 0 can be indicated. In this case, only rank=4/8 can be indicated.

In some arrangements, if 2 bits for SRS resource indication is present, 4 values may correspond to the first 1, 2, 3, or 4 SRS resource for each of the indicated panel are indicated respectively.

In some arrangements, if 2 bits for SRS resource indication is present, 4 values may correspond to the first 1, 2, 3, or 4 SRS resource for the first (or the last based on the panel index) of the indicated panel are indicated respectively, all 4 SRS resources for the other indicated panel(s).

In some arrangements, frequency selective precoding for non-codebook based PUSCH is disclosed. In some arrangements, a sub-band (PRB bundling) size can be determined according to gNB indication or reused from DL PRG. In some arrangements, SRS transmission can be sub-band or wideband, SRI can be sub-band or wideband. In some arrangements, SRI can be wideband+sub-band, for rank>1.

In some arrangements, SRI overhead reduction for non-codebook based PUSCH is disclosed. In some arrangements, only number of SRS resources can be needed, instead of the exact indexes of the chosen SRS resources. In some arrangements, panel/SRS resource group indication with or without SRS resource indication is disclosed.

In some arrangements, a wireless communication method includes determining, by a wireless communication device, channel conditions with respect to communications between the wireless communication device and a network. The method may include determining, by the wireless communication device, an uplink reference signal resource based on channel conditions and a predefined order of a plurality of uplink reference signal resources, the plurality of uplink reference signal resources including the uplink reference signal resource. The method may include transmitting, by the wireless communication device to the network, an uplink reference signal on the uplink reference signal resource.

In some arrangements, the UE transmits SRS based on channel condition, in a predefined order. For example, a UE can transmit SRS resources in a SRS resource set according to a predefined order (e.g. ascending or descending order) of channel conditions, e.g. based on DL-RS (e.g. CSI-RS). For example, SRS transmission with better precoder/SNR can be arranged to the SRS resource with lower or higher SRS resource index for an ascending or a descending order. In some arrangements, the SRS resource with lower (or higher) SRS resource index can be associated with better precoder/SNR.

In some arrangements, the UE can determine at least one SRS resource according to an SRI. For example, SRI can be determined based on at least one group of SRS resources.

In some arrangements, one of two schemes or both schemes can be implemented for overhead reduction. In the first scheme, the SRI can be from a predefined or a configured list/table. The list/table can include at least one entry for each rank. For a rank value R, an entry can indicate R SRS resource(s) from G groups (e.g., SRS resource group, or port group), where R or G is an integer. G can include a number of SRS resource groups or port groups in a SRS resource set. For example, $$\sum_{g=0}^{G-1} x_g = R,$$

$x_g$ can mean a number of SRS resources or number of ports in group g. A value of $x_g$ can be an integer equal to or greater than 0.

In some arrangements, the $x_g$ can indicate the first $x_g$ SRS resources in group g in a predefined order (lowest index, or highest index in a group). Then only the number of SRS resources (or SRS ports or layers) may be needed, instead of the exact indexes of the chosen SRS resources In the second scheme, panel/SRS resource group indication with or without SRS resource indication can be considered for SRI overhead reduction.

The UE can transmit PUSCH based on the SRS resources indicated by SRI. (e.g., precoding of PUSCH can be the same as the indicated SRS).

FIGS. 7-11 illustrate flow charts of example wireless communication processes, in accordance with some arrangements. Although each of the flow charts show a certain order, arrangements are not limited thereto, and the order of operations of the processes may be changed in any suitable manner.

Figure 7:
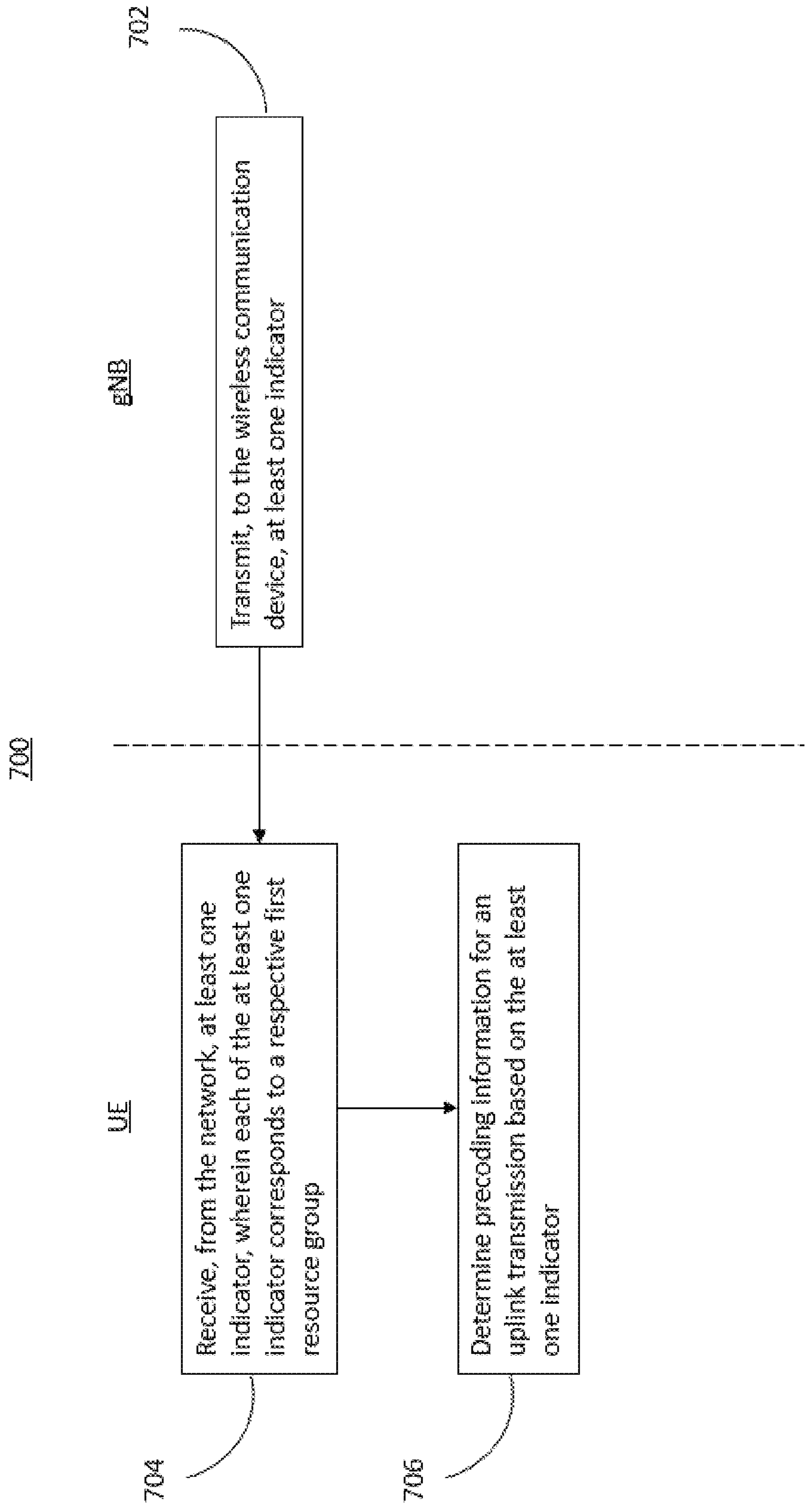
FIGS. 7, 8, 9, 10, and 11 illustrate flow charts of example wireless communication processes, in accordance with some arrangements of the present disclosure.

FIG. 7 illustrates a flow chart of an example wireless communication process 700 according to some arrangements. The process 700 includes transmitting, by a network (e.g., gNB) to a wireless communication device (e.g., UE), at least one indicator (702). Each of the at least one indicator corresponds to a respective first resource group. The process 700 includes receiving, by the wireless communication device from the network, at least one indicator (704). The process 700 includes determining precoding information for an uplink transmission based on the at least one indicator (706).

Figure 8:
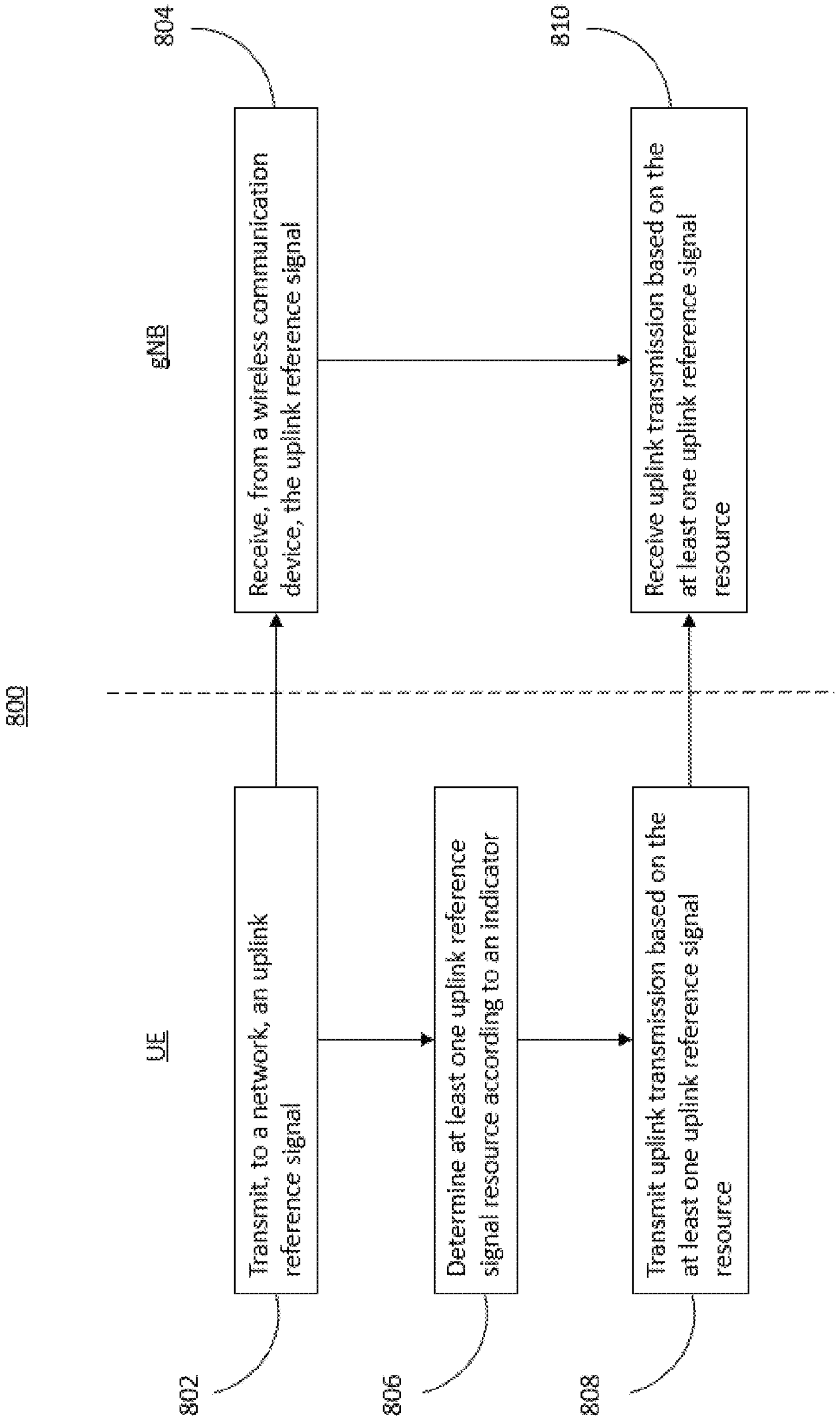

FIG. 8 illustrates a flow chart of an example wireless communication process 800 according to some arrangements. The process 800 includes transmitting, by a wireless communication device (e.g., UE) to the network (e.g., gNB), an uplink reference signal (802). The process 800 includes receiving, by the network from the wireless communication device, the uplink reference signal (804). The process 800 includes determining, by the wireless communication device, at least one uplink reference signal resource according to an indicator (806). The process 800 includes transmitting, by the wireless communication device, uplink transmission based on the at least one uplink reference signal resource (808). The process 800 includes receiving, by the network, the uplink transmission (810).

Figure 9:
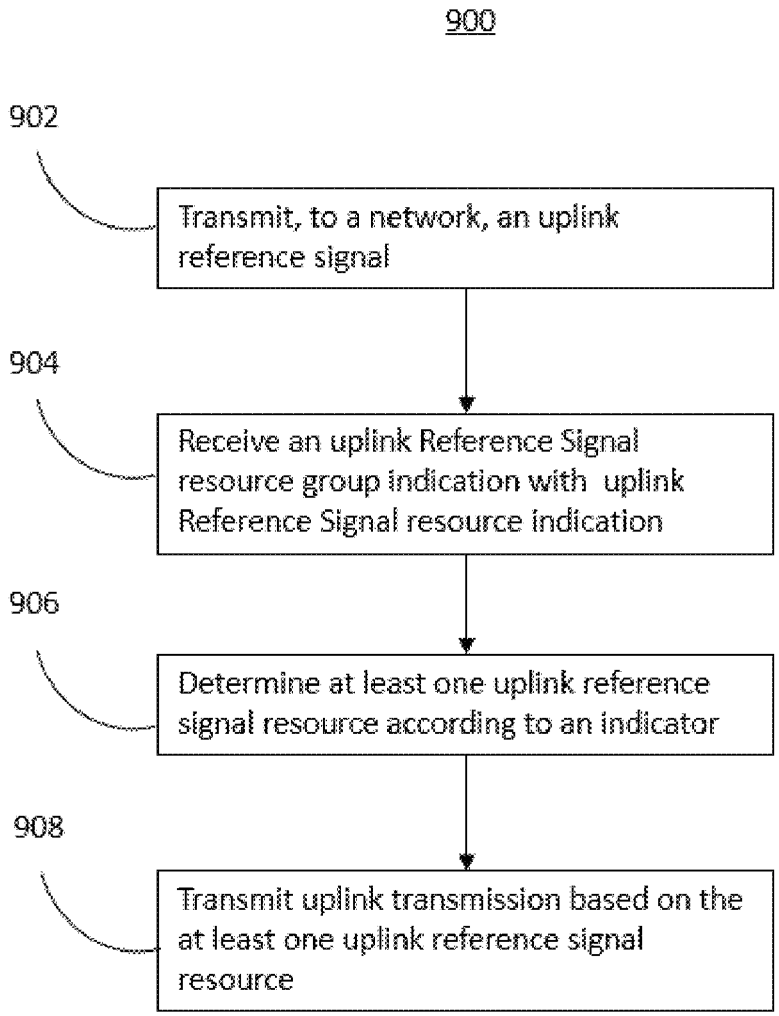

FIG. 9 illustrates a flow chart of an example wireless communication process 900 according to some arrangements. The process 900 is performed by the UE. The process 900 includes transmitting, to the network, an uplink reference signal (902). The process 900 includes receiving an uplink Reference Signal resource group indication with uplink Reference Signal resource indication (904). The process 900 includes determining at least one uplink reference signal resource according to an indicator (906). The process 900 includes transmitting uplink transmission based on the at least one uplink reference signal resource (908).

Figure 10:
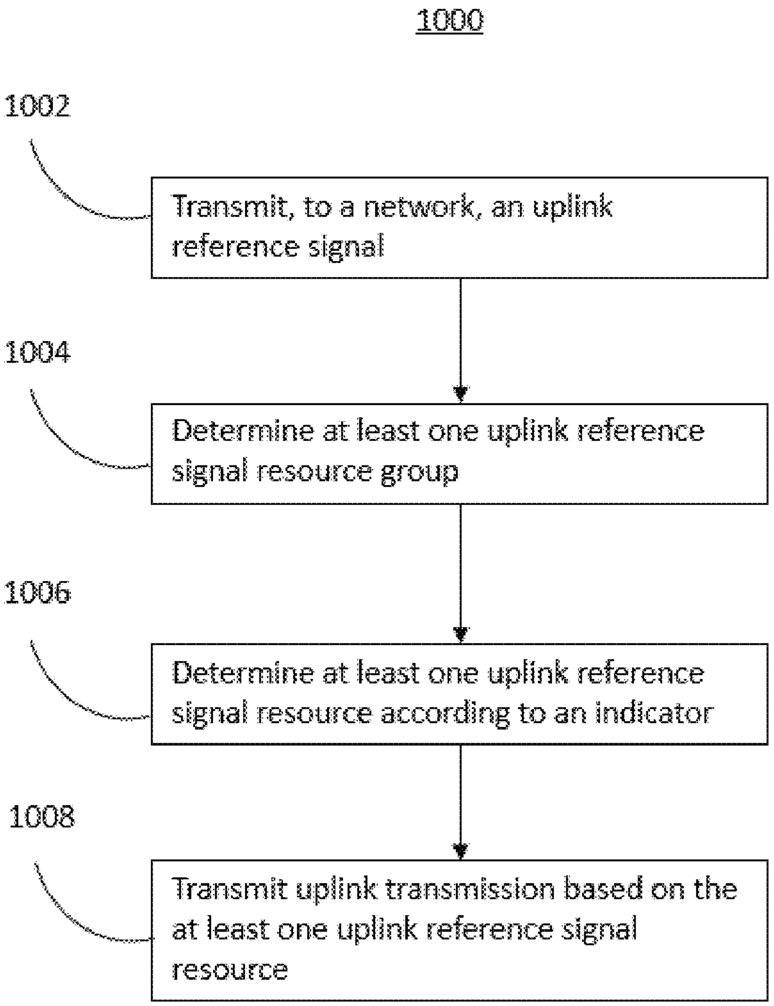

FIG. 10 illustrates a flow chart of an example wireless communication process 1000 according to some arrangements. The process 1000 is performed by the UE. The process 1000 includes transmitting, to the network, an uplink reference signal (1002). The process 1000 includes determine at least one uplink reference signal resource group (1004). The process 1000 includes determining at least one uplink reference signal resource according to an indicator (1006). The process 1000 includes transmitting uplink transmission based on the at least one uplink reference signal resource (1008).

Figure 11:
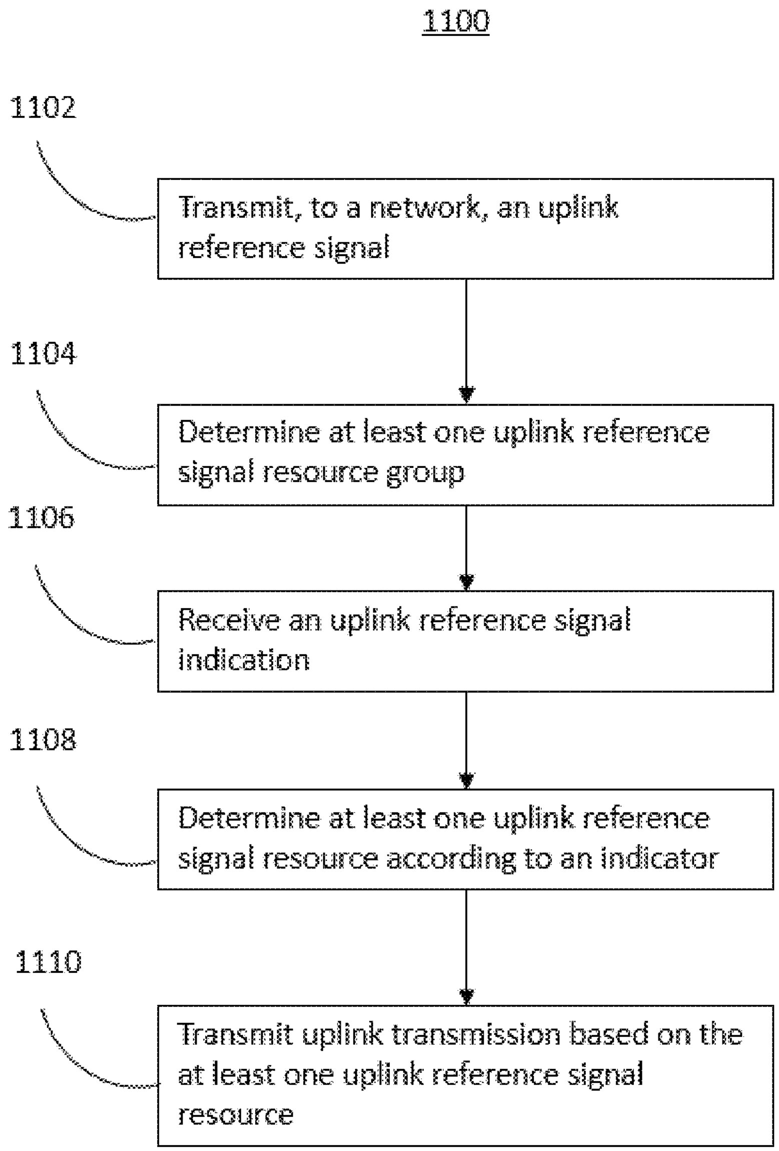

FIG. 11 illustrates a flow chart of an example wireless communication process 1100 according to some arrangements. The process 1100 is performed by the UE. The process 1100 includes transmitting, to the network, an uplink reference signal (1102). The process 1100 includes determine at least one uplink reference signal resource group (1104). The process 1100 includes receiving an uplink reference signal indication (1106). The uplink reference signal indication indicates a number (M) of one or more uplink reference signal resources in each of the at least one uplink reference signal resource group, or a number (M) of one or more uplink reference signal resources in at least one given uplink reference signal resource group, where M is an integer from 1 to a number of uplink reference signal resources in a uplink reference signal resource group. The process 1100 includes determining at least one uplink reference signal resource according to an indicator (1108). The process 1100 includes transmitting uplink transmission based on the at least one uplink reference signal resource (1110).

In some arrangements, 1 bit for SRS resource indication can be present, 2 values may correspond to the first SRS resource for each of the indicated panel that are indicated, and both SRS resources for each of the indicated panel can be indicated respectively. In some arrangements, 1 bit for SRS resource indication is present, 2 values may correspond to the first SRS resource for each of the indicated panel that are indicated, and the second SRS resource for each of the indicated panel can be indicated respectively.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the arrangements described in this disclosure will be readily apparent to those skilled in the art, and the general principles defined herein can be applied to other arrangements without departing from the scope of this disclosure. Thus, the disclosure is not intended to be limited to the arrangements shown herein, but is to be accorded the widest scope consistent with the novel features and principles disclosed herein, as recited in the claims below.

The invention claimed is:

1. A wireless communication method, comprising:

receiving, by a wireless communication device from a network, at least one indicator, wherein each of the at least one indicator corresponds to a respective first resource group; and determining precoding information comprising at least one of a plurality of precoders for an uplink transmission based on the at least one indicator, wherein the at least one indicator comprises a first indicator and at least one second indicator, the first indicator corresponding to a wideband, and each of the at least one second indicator corresponds to a respective sub-band, wherein the first indicator indicates a first precoder of the plurality of precoders for a first layer of the uplink transmission and the at least one second indicator indicates a second precoder of the plurality of precoders for a second layer of the uplink transmission other than the first layer.

2. The method of claim 1, wherein the indicator comprises a sounding reference signal (SRS) resource indicator (SRI); or the uplink transmission comprises a Physical Uplink Shared Channel (PUSCH) transmission.

3. The method of claim 1, wherein the first resource group comprises one or more resource blocks (RBs) according to at least one of:

a sub-band bandwidth, a wideband bandwidth, a bandwidth of scheduled resource for the uplink transmission, a bandwidth of a serving cell on which the uplink transmission is transmitted; or a bandwidth of a Bandwidth Part (BWP) on which the uplink transmission is transmitted.

4. The method of claim 3, wherein the sub-band bandwidth is determined according to one of:

a basic sub-band bandwidth, received by the wireless communication device from the network, for an uplink transmission; or a Physical Resource Block (PRB) bundling size for a downlink transmission determined by the wireless communication device.

5. The method of claim 3, wherein the precoding information comprises first precoding information and second precoding information, and the first precoding information for an uplink transmission on a first frequency resource is same as the second precoding information for an uplink transmission on a second frequency resource, wherein the second frequency resource corresponds to a first frequency resource with frequency hopping.

6. The method of claim 5, wherein a frequency hopping offset is determined based on an integer value multiplied by the sub-band bandwidth.

7. The method of claim 1, wherein determining, by a wireless communication device, a second resource group for transmitting an uplink reference signal to the network.

8. The method of claim 7, wherein at least one of:

precoders for a transmission of the uplink reference signal on at least one Resource Block (RB) or at least one Resource Element (RE) within a first resource group are same;

precoders for a transmission of the uplink reference signal on at least one Resource Block (RB) or at least one Resource Element (RE) within a second resource group are same; or precoders for a transmission of the uplink transmission on at least one Resource Block (RB) or at least one Resource Element (RE) within a first resource group are same.

9. The method of claim 7, wherein the second resource group is determined according to one of:

a sub-band bandwidth, a wideband bandwidth, a bandwidth of scheduled resource for the uplink reference signal, a bandwidth of a serving cell on which the uplink reference signal is transmitted; or a bandwidth of a Bandwidth Part (BWP) on which the uplink reference signal is transmitted.

10. The method of claim 1, wherein the precoding information for the uplink transmission on a first resource group is same as precoding information for an uplink reference signal resource indicated by the indicator for the first resource group.

11. The method of claim 1, wherein a rank of the uplink transmission is greater than 1.

12. A wireless communication device, comprising:

at least one processor configured to:

receive, via a receiver from a network, at least one indicator, wherein each of the at least one indicator corresponds to a respective first resource group; and determine precoding information comprising at least one of a plurality of precoders for an uplink transmission based on the at least one indicator, wherein the at least one indicator comprises a first indicator and at least one second indicator, the first indicator corresponding to a wideband, and each of the at least one second indicator corresponds to a respective sub-band, wherein the first indicator indicates a first precoder of the plurality of precoders for a first layer of the uplink transmission and the at least one second indicator indicates a second precoder of the plurality of precoders for a second layer of the uplink transmission other than the first layer.

13. A wireless communication method, comprising:

sending, by a network node to a wireless communication device, at least one indicator, wherein each of the at least one indicator corresponds to a respective first resource group; and wherein precoding information comprising at least one of a plurality of precoders is determined for an uplink transmission based on the at least one indicator, wherein the at least one indicator comprises a first indicator and at least one second indicator, the first indicator corresponding to a wideband, and each of the at least one second indicator corresponds to a respective sub-band, and wherein the first indicator indicates a first precoder of the plurality of precoders for a first layer of the uplink transmission and the at least one second indicator indicates a second precoder of the plurality of precoders for a second layer of the uplink transmission other than the first layer.

14. A network node, comprising:

at least one processor configured to:

send, via a transmitter to a wireless communication device, at least one indicator, wherein each of the at least one indicator corresponds to a respective first resource group, wherein precoding information comprising at least one of a plurality of precoders is determined for an uplink transmission based on the at least one indicator, wherein the at least one indicator comprises a first indicator and at least one second indicator, the first indicator corresponding to a wideband, and each of the at least one second indicator corresponds to a respective sub-band, and wherein the first indicator indicates a first precoder of the plurality of precoders for a first layer of the uplink transmission and the at least one second indicator indicates a second precoder of the plurality of precoders for a second layer of the uplink transmission other than the first layer.

15. The network node of claim 14, wherein the indicator comprises a sounding reference signal (SRS) resource indicator (SRI); or the uplink transmission comprises a Physical Uplink Shared Channel (PUSCH) transmission.

16. The network node of claim 14, wherein the first resource group comprises one or more resource blocks (RBs) according to at least one of:

a sub-band bandwidth, a wideband bandwidth, a bandwidth of scheduled resource for the uplink transmission, a bandwidth of a serving cell on which the uplink transmission is transmitted; or a bandwidth of a Bandwidth Part (BWP) on which the uplink transmission is transmitted.

17. The network node of claim 16, wherein the sub-band bandwidth is determined according to one of:

a basic sub-band bandwidth, received by the wireless communication device from the network, for an uplink transmission; or a Physical Resource Block (PRB) bundling size for a downlink transmission determined by the wireless communication device.

18. The network node of claim 16, wherein the precoding information comprises first precoding information and second precoding information, and the first precoding information for an uplink transmission on a first frequency resource is same as the second precoding information for an uplink transmission on a second frequency resource, wherein the second frequency resource corresponds to a first frequency resource with frequency hopping.

* * * * *